United States Patent [19]
Ajwani

[11] 3,744,602
[45] July 10, 1973

[54] COMBINED AIR SYSTEM FOR STARTER AND BRAKES

[75] Inventor: Prem L. Ajwani, Lake Zurick, Ill.

[73] Assignee: International Harvester Company, Chicago, Ill.

[22] Filed: Oct. 12, 1971

[21] Appl. No.: 188,063

[52] U.S. Cl............... 192/3 R, 123/179 F, 180/82, 303/9, 417/26
[51] Int. Cl................................................ B60k 29/02
[58] Field of Search............................. 192/3 R, 1; 123/179 F

[56] References Cited
UNITED STATES PATENTS

| | | | |
|---|---|---|---|
| 3,582,233 | 6/1971 | Bloom.................................. | 417/26 |
| 1,133,488 | 3/1915 | McMurtry...................... | 123/179 F |
| 2,459,938 | 1/1949 | Higgins................................ | 192/3 R |
| 2,940,561 | 6/1960 | Atkin.................................... | 192/3 R |

*Primary Examiner*—Benjamin W. Wyche
*Attorney*—Floyd B. Harman

[57] ABSTRACT

A combined air system for a vehicle in which an engine driven compressor supplies air pressure to a pair of separate reservoir means, one for the air actuated brakes and one for the engine air starter. The reservoirs are isolated from each other by check valve means and are charged at different maximum pressures by virtue of a limiting valve. A relay valve controls the air pressure to the engine air starter and is actuated by a starter valve connected to the brake reservoir so that the engine can be started only if there is sufficient air in the brake reservoir for subsequent safe operation of the vehicle.

10 Claims, 2 Drawing Figures

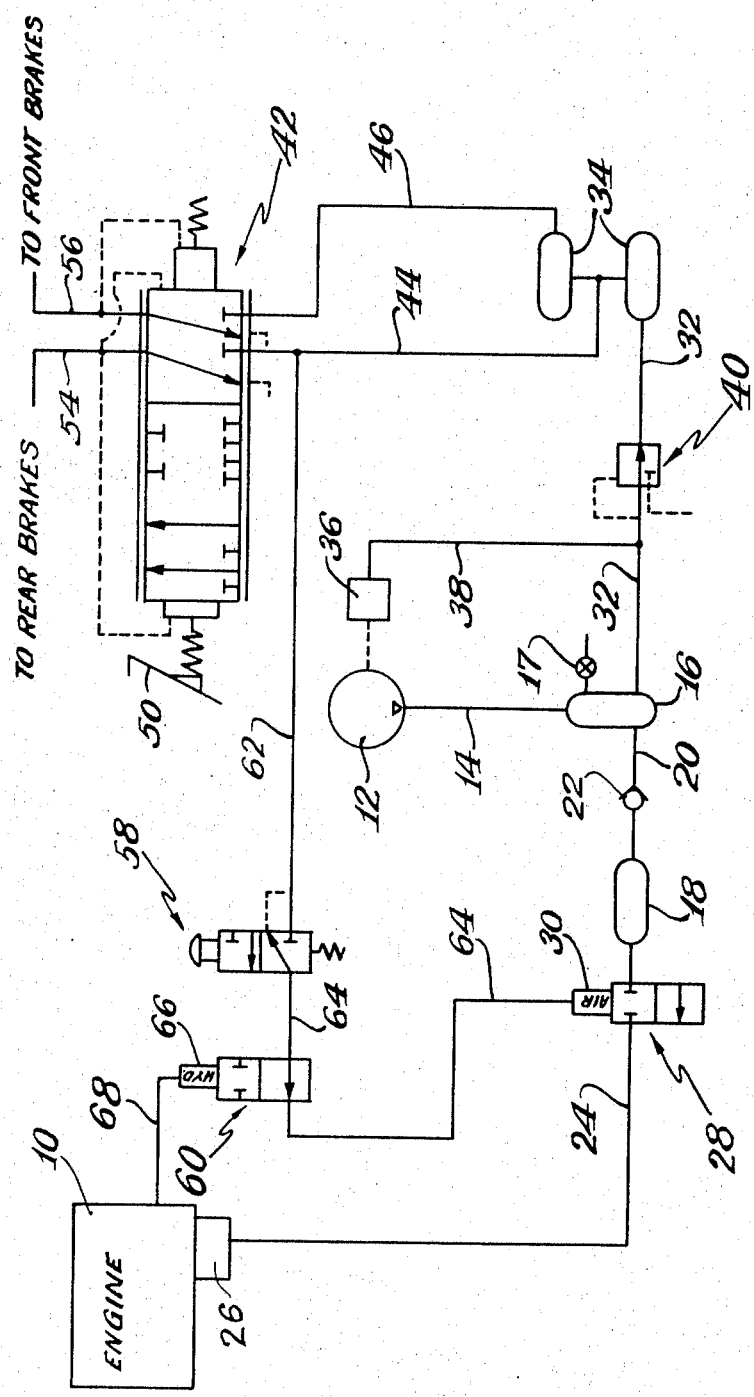

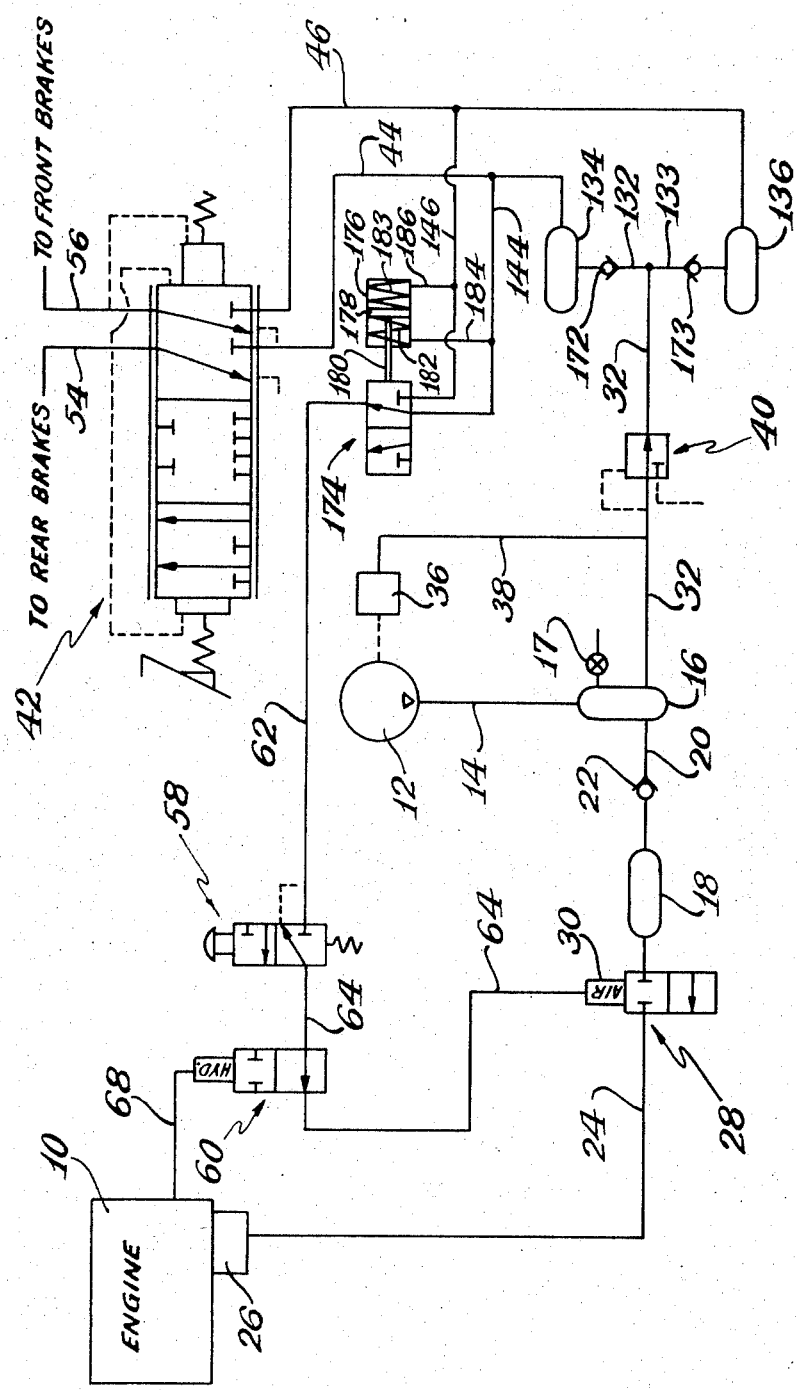

COMBINED AIR SYSTEM FOR STARTER AND BRAKES

BACKGROUND AND SUMMARY OF THE INVENTION

Air starters for cranking of internal combustion engines, particularly the relatively large displacement engines, has been well received. Such starters provide the needed power, are highly reliable and are relatively unaffected by cold weather. In addition, a supply of air pressure is always available at most sites and it is a relatively easy and quick operation to charge the system from the external source and start the vehicle's engine. Air over hydraulic brake systems also have been well received and are widely used in production machines.

The maximum pressure necessary for successful operation of the air starter is conventionally higher than the maximum air pressure permitted by the components of the air over hydraulic brake system. When both systems, i.e., air starting and air actuated brakes, are utilized in the same machine, it is necessary to provide air pressure for each system at different maximum air pressures.

In machines that are designed to be charged with air pressure from an external source, it is preferable to require the operator to charge the vehicle's systems from the external source rather than to permit him to start his engine and utilize the engine driven compressor to being the systems up to maximum air pressure. Such an arrangement is preferred because it may be possible for the vehicle to have sufficient air pressure to start the engine and yet have insufficient air pressure for adequate operation of the brakes. An inexperienced or careless operator could, under such conditions, start the engine, fail to wait until the brake system has been adequately charged by the vehicle's engine driven compressor, and place the vehicle in motion without having the capability of stopping the vehicle within an acceptable distance.

It is therefore an object of the present invention to provide a combined air system for a vehicle in which a single compressor is driven by the engine to supply air pressure to both an air starter system and an air actuated brake system at the desired maximum pressure for each system.

It is also an object of this invention to provide separate and isolated reservoirs for air start and brake systems on a vehicle at different maximum pressures by means of a single compressor.

It is also an object of this invention to provide separate and isolated starter and brake systems in which control of the starting system is responsive to a minimum pressure being present in the brake system.

It is still another object of this invention to provide air start and air brake systems on a vehicle which will preclude starting of the engine.

These and other objects of the present invention will become more readily apparent upon a perusal of the following specification and the accompanying drawing, wherein:

FIG. 1 is a schematic representation of a preferred embodiment of combined air system according to the present invention; and FIG. 2 is a second embodiment of such an air system.

DESCRIPTION OF A PREFERRED EMBODIMENT

Referring now to FIG. 1, there is shown an engine 10 which drives an air compressor 12. The output from the compressor 12 is directed through a conduit 14 to a wet tank 16. The starter reservoir 18 communicates with the wet tank 16 through a conduit 20. A check valve 22 is provided in the conduit 20 and permits flow only from the wet tank 16 to the starter reservoir 18. A conduit 24 connects the starter reservoir 18 with the air starter 26, which is mounted on the engine and arranged to crank the engine whenever air under pressure is directed through the conduit 24 to the starter 26. A relay valve 28 is interposed in the conduit 24 and normally blocks the flow of air through the conduit 24. The relay valve 28 is of the two position type and is pilot actuated by means of an actuator 30, which actuator is capable of shifting the relay valve 28 so that air in the starter reservoir 18 can be transmitted through the conduit 24 to the air starter 26. The actuator 30 is designed so that it will not shift the relay valve 28 to its open position unless it receives air pressure above a predetermined minimum value, e.g., air pressure at 60 psi or greater. A charge valve 17 permits the charging of the wet tank 16, and hence the entire system, from an external source whenever the pressure drops below the minimum value. The means for controlling the air pressure directed to the actuator 30 will be explained hereinafter.

A second conduit 32 connects the wet tank 16 with the brake reservoir 34. A governor 36 communicates with the conduit 32 through a conduit 38 and is operatively connected with the compressor 12 to limit the maximum pressure output by the compressor. A valve means 40 is interposed in the conduit 32 and functions both as a limiting valve and as a one-way check valve. That is, the valve means 40 functions to permit the flow of air only from the wet tank 16 to the brake reservoir 34, which is its check valve function, and as a limiting valve, the valve means 40 permits the maximum pressure to the brake reservoir 34 to a value less than the maximum pressure output of the compressor 12 as determined by the governor 36. For example, if the governor 36 is arranged to sense the pressure output of the compressor 12 through the sensing conduit 38 in order to limit the maximum pressure to the starter reservoir 18 at 150 psi, the limiting valve would be set to admit only 100 psi to the brake reservoir 34.

A brake treadle valve 42, which is of the dual ported type, is connected with the brake reservoir 34 by means of conduits 44 and 46. The treadle valve 42 is spring biased to the position shown and is movable by means of treadle 50 toward the right in which the conduit 44 communicates with the conduit 54 leading to the power clusters for the rear brakes and the conduit 46 communicates with the conduit 56 leading to the power clusters for the front brakes. These power clusters are conventional air over hydraulic units.

Control of the air actuator 30 for the relay valve 28 is by means of an air start valve 58 and a series connected starter protection valve 60. The conduit 62 extends between and provides fluid communication between the conduit 44 and the inlet port of the starter valve 58. The starter valve 58 is normally biased to the position shown in the drawing in which the inlet port is blocked and the outlet conduit 64 is exhausted to atmosphere. Whenever the valve 58 is depressed against the bias of the spring the valve spool is shifted to provide fluid communication between the conduits 62 and 64 directing air pressure to the air actuator 30. The starter protector valve is interposed within the conduit 64 and is normally urged to the position shown in the drawing in which fluid communication through the valve 60 is permitted. The starter protection valve 60 is provided with a hydraulic actuator 66 which is connected through a conduit 68 with the oil lubricating system in the engine 10. The hydraulic actuator is arranged to shift the valve whenever the oil pressure developed by the engine has reached a predetermined minimum value, which value would normally correspond with the oil pressure developed by the engine at idle speed. Hence, once the engine 10 is operating oil pressure acting through the conduit 68 on the hydraulic actuator 66 would shift the spool to block communication through the conduit 64. This would, therefore, preclude damaging of the starter or the engine fly wheel by inadvertent depressing of the starter valve 58 whenever the engine is running.

The embodiment of FIG. 2 is similar to that of FIG. 1 except that it is provided with completely independent braking systems, front and rear, and a low pressure selector means for directing that pressure in the two systems, i.e., front and rear, which is lower to the starter valve 58. In order to provide completely independent or split brake systems, the supply conduit 32 leading from the wet tank 16 communicates with a conduit 132 leading to the rear brake reservoir 134 and conduit 133 communicating with the front brake reservoir 136. One-way check valves 172 and 173 are provided in the conduits 132 and 133 respectively and permit flow only into the respective reservoirs 134 and 136. These check valves 172 and 173 thereby isolate the two reservoirs from each other. The rear brake supply conduit 44 provides communication from the rear brake reservoir 134 to the treadle valve 142 and the front brake supply conduit 46 connects with the front brake reservoir 136 and the treadle valve 142. The treadle valve 142, is preferably of the type which permits the actuation of both front and rear brakes in the event air pressure is lost in either one of the reservoirs 134 and 136, and may be of the type sold by Bendix Westinghouse Automotive Air Brake Company and identified as their E-4 Dual Brake Valve.

The conduit 62 is connected with the output port of a two position low pressure selector valve 174. A pair of conduits 144 and 146 are connected with supply conduits 44 and 46 respectively and with the inlet ports of the valve 174. In the position illustrated in FIG. 2, the conduit 146 is blocked and the conduit 144 is in communication with the conduit 62. In the shifted position of the valve 174, i.e., when the valve 174 is shifted to the right, the conduit 146 is in communication with the conduit 62 while the conduit 144 is blocked. It will be apparent therefore that the conduit 62 will receive pressure from either of the reservoirs 134 and 136, depending upon the position of the valve.

The position of the valve 174 is determined by a slave cylinder 176 which contains a reciprocal piston 178 connected with the valve 174 by means of a piston rod 180. Centering springs 182 and 183 center the piston 178 and urge the valve 174 to the position illustrated. The rod end of the cylinder 176 is connected with conduit 144 by means of conduit 184, while the head end of cylinder 176 is connected with conduit 146 by means of conduit 186. The rod face of the piston 178 is subjected to the pressure in the rear brake reservoir 134 and the head end surface of the piston 178 is subjected to the pressure in the front brake reservoir 136. When the pressures in the two reservoirs 134 and 136 are equal, or substantially equal, the centering springs 182 and 183 as well as the larger area on the head end surface of the piston 178 will maintain the piston centered and the valve 174 in the position illustrated. If the pressure in the rear brake reservoir 134 should drop so that it is substantially lower than the pressure in the reservoir 136, the piston will remain in the illustrated position, communicating the lower pressure in the reservoir 134 to the conduit 62 because the valve 174 is at the limit of its travel toward the left. However, if the pressure in reservoir 136 should drop so that it is substantially lower than the pressure in reservoir 134, the higher pressure in reservoir 134 will act against the piston 178 forcing it toward the right and shifting the valve 174 so that the conduit 146 is in communication with the conduit 62. This permits the lower pressure in the front brake reservoir 136 to be communicated to the conduit 62.

It can be seen from the foregoing that the low pressure selector valve 174 will always transmit the lower of the two pressures present in the reservoirs 134 and 136 to the air actuator 30 on the relay valve 28. Since the air actuator 30 is constructed so that it will not shift the relay valve 28 unless it receives air pressure equal to or greater than 60 psi, an operator even though he depresses the air start valve 58, will be unable to start the engine when either of the reservoirs 134 and 136 have less than 60 psi air pressure.

While two embodiments of the present invention have been disclosed, it is to be understood that various changes and modifications may be made without departing from the spirit of the invention as defined by the scope of the appended claims.

What is claimed is:

1. A combined air system for a vehicle having air operated brakes and an air operated engine starter; comprising:
   a brake reservoir means;
   means for selectively connecting said brake reservoir with said brakes to effect application and release of the brakes;
   a separate starter reservoir means;
   conduit means extending between said starter reservoir and said engine starter;
   an engine-driven compressor for supplying air under pressure to both of said reservoir means; and
   limiting valve means interposed between said compressor and the brake reservoir means for limiting the maximum pressure therein to a pressure lower than the maximum pressure permitted in the starter reservoir means.

2. A combined air system according to claim 1, and further comprising check valve means for isolating said brake and starter reservoirs from each other.

3. A combined air system according to claim 1, and further comprising:
   relay valve means interposed in said conduit means and normally preventing communication between said starter reservoir and said engine starter; and
   starter valve means for selectively directing air pressure from said brake reservoir to said relay valve means for opening the latter means permitting air from the starter reservoir to actuate said starter.

4. A combined air system according to claim 3, wherein said relay valve means opens only at pressures above a predetermined pressure in said brake reservoir.

5. A combined air system according to claim 3, and further comprising:
protection valve means normally permitting communication between said brake reservoir and said relay valve and movable to a position blocking such communication in response to development of oil pressure above a predetermined level within the engine.

6. A combined air system for a vehicle having an engine, an air operated starter for the engine, and air operated brakes; comprising:
a compressor driven by the engine;
a wet tank capable of accepting air under pressure produced by the compressor;
separate brake and starter reservoirs communicatively connected to said wet tank;
means for selectively connecting said brake reservoir with said brakes to effect application and release of the brakes;
conduit means extending between said starter reservoir and said engine starter;
check valve means interposed between said starter reservoir and said wet tank for permitting flow of air only from said tank to said starter reservoir;
check and limiting valve means interposed between said brake reservoir and said tank for permitting flow of air only from said tank to said brake reservoir and for limiting the maximum pressure in said brake reservoir to a pressure lower than the maximum pressure in said starter reservoir.

7. A combined air system according to claim 6, and further comprising:
relay valve means having an air actuator normally blocking communication between the starter reservoir and the starter;
starter valve means normally blocking communication between the brake reservoir and said air actuator and manually shiftable to direct air pressure from the brake reservoir to said air actuator to open said relay valve means;
whereby air pressure from the starter reservoir is directed to the starter.

8. A combined air system according to claim 7 and further comprising:
a starter protection valve having a hydraulic actuator normally permitting communication between said brake reservoir and said air actuator;
means communicating engine oil pressure to said hydraulic actuator; and
said hydraulic actuator being responsive to development of a predetermined oil pressure by said engine to shift said starter protection valve to block communication between said brake reservoir and said air actuator;
whereby the starter is prevented from being actuated whenever the engine is running.

9. A combined air system according to claim 7, wherein;
said air actuator is effective to shift said relay valve means to its open position only when the air pressure received by the air actuator is above a predetermined level;
whereby the engine can be started only when the brake reservoir has sufficient air pressure for subsequent safe operation of the vehicle.

10. A combined air system according to claim 9, wherein said brake reservoir comprises separate and isolated front and rear brake reservoir means; and further comprising:
a low pressure selector valve means for providing fluid communication between one of said front and rear brake reservoir means and said starter valve means; and
comparator and shifter means connected to said selector valve means and capable of comparing the pressures in said front and rear brake reservoir means and shifting said selector valve means to communicate the lower pressure in said reservoir means to said starter valve means.

* * * * *